Jan. 17, 1939.    C. C. KASKELL    2,144,538
DRIVE MEANS FOR VEHICLES AND THE LIKE
Filed March 18, 1936    2 Sheets-Sheet 1
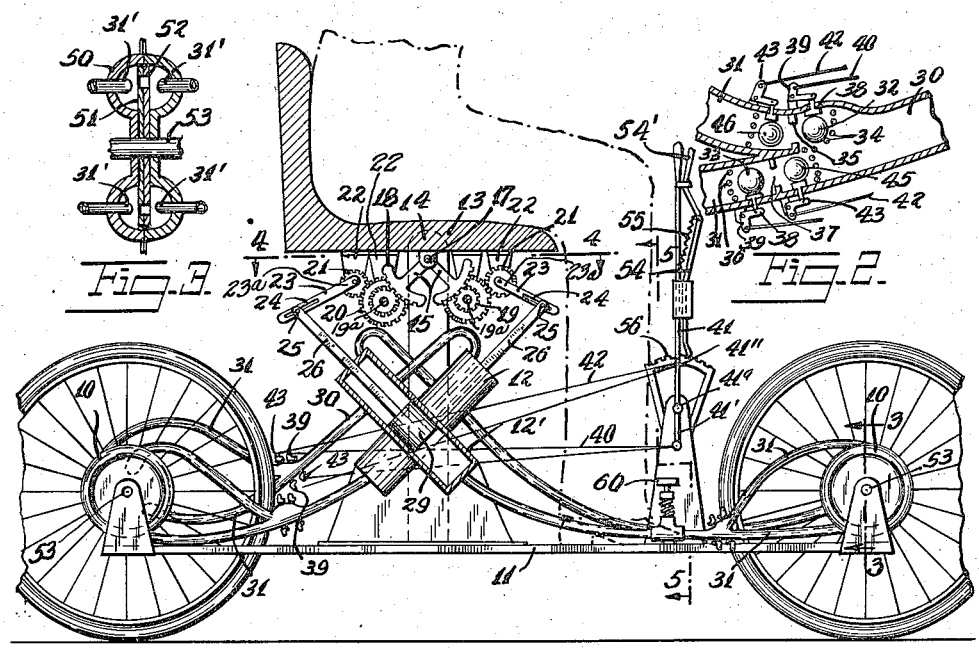
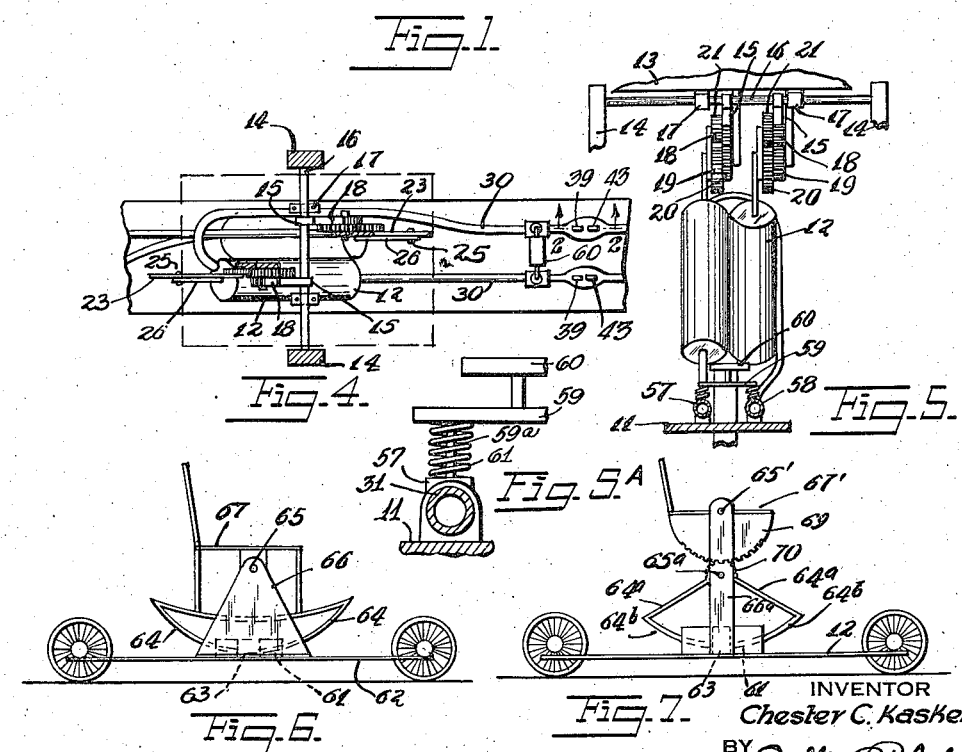
INVENTOR
Chester C. Kaskell
BY
ATTORNEY

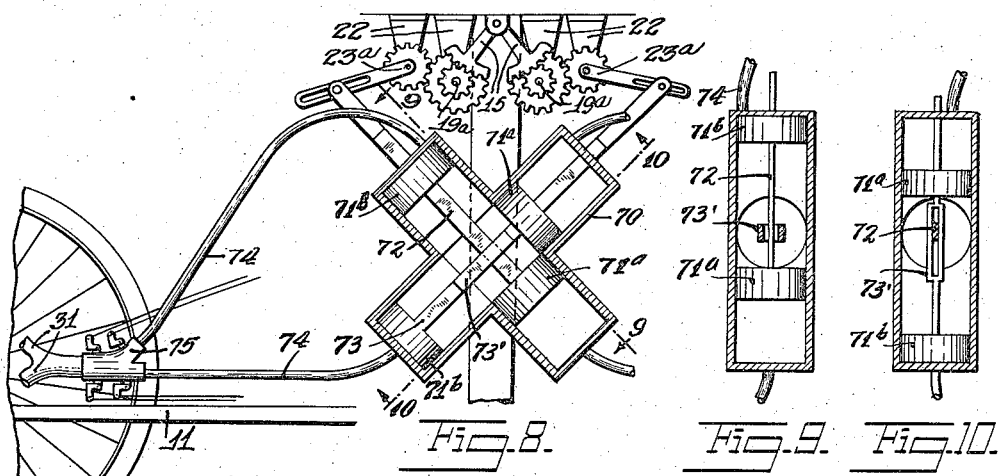

Patented Jan. 17, 1939

2,144,538

UNITED STATES PATENT OFFICE 2,144,538

DRIVE MEANS FOR VEHICLES AND THE LIKE

Chester C. Kaskell, Toledo, Ohio

Application March 18, 1936, Serial No. 69,523

11 Claims. (Cl. 280—216)

This invention relates to new and useful improvements in a drive means for vehicles and the like.

The invention has for an object the construction of a device as mentioned which is capable of harnessing the power that may be developed from the dead weight of human bodies when shifted off-center, as in the motion of rocking a chair, so that this power may be utilized for driving land, sea, and air vehicles, propellers, fans, and other susceptible devices capable of being driven by means of muscular effort.

A further object of the invention is to teach various methods and means of harnessing the power mentioned in the previous paragraph by shifting the dead weights in different ways, as for example, in the motion of a see-saw or fulcrum levers, or shifting from right to left, or to and fro, etc.

Still further the invention has for an object the construction of a specific mechanism for harnessing the power mentioned in the previous paragraphs which is characterized by a liquid fluid turbine for driving said land, sea or air vehicles, propellers, fans, and other devices controlled by a circuit for liquid which is actuated by a pump capable of circulating said liquid in one direction or in the other for driving the vehicle or the like in one direction or the other direction, and said pump to be manually operable by a mechanism operated by the dead weight of human bodies shifted off-center, or in a similar manner as previously explained. The preferred liquid is oil, but any other similar liquid might be used.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a fragmentary side elevational view of a device constructed according to this invention with a few cables not shown for the sake of clearness in illustrating other parts.

Fig. 2 is a fragmentary enlarged sectional view of a portion of the circuit for the liquid.

Fig. 3 is a sectional view of one of the liquid turbines used in the device.

Fig. 4 is a fragmentary plan view looking in the direction of the line 4—4 of Fig. 1.

Fig. 5 is a fragmentary sectional view taken on the line 5—5 of Fig. 1.

Fig. 5ª is an enlarged detailed view of a portion of Fig. 5.

Fig. 6 is a side elevational view of a portion of the device constructed according to a modification of the invention.

Fig. 7 is a portion of another device constructed according to another embodiment of this invention.

Fig. 8 is a fragmentary sectional view of a modified form of pump capable of being used in the various devices.

Fig. 9 is a sectional view taken on the line 9—9 of Fig. 8.

Fig. 10 is a sectional view taken on the line 10—10 of Fig. 8.

Fig. 11 is a side elevational view of a device constructed according to another embodiment of this invention.

Fig. 12 is a side elevational view of another modified form of device embodying the invention.

In Figs. 1–5 inclusive a drive means for vehicles and the like has been illustrated and it includes fluid turbines 10 for driving a vehicle 11, a circuit for the fluid for said turbines, a pump 12 for circulating said fluid in one direction or the other for driving the vehicle or the like in one direction or the other, and a manually operable rocker mechanism including a chair 13 for operating said pump.

The chair 13 is pivotally supported on standards 14 mounted on the vehicle 11. Several arms 15 project from a shaft 16 to which lugs 17 are attached. These arms are fixedly attached to the shaft. These lugs are fixedly mounted on the bottom of the chair 13. At the ends of the arms 15 there are arcuate racks 18 which mesh with gears 19 fixed on shafts 19ª rotatively supported in brackets 22 on the bottom of the chair 13 and also provided with gears 20. The gears 20 mesh with gears 21 rotatively supported on brackets 22 mounted on the bottom of the chair 13. Radial arms 23 are rigidly attached upon the sides of the gears 21 by means of pins 23ª which engage through the gear 21 and the arms 23, and are adapted to move through small angular distances when the chair 13 is rocked. These arms 23 are formed with elongated slots 24 in which pins 25 engage. These pins are mounted upon piston rods 26 connected with pistons 29 working in cylinders 12'. Thus far the arrangement is such that when the chair 13 is rocked the pistons 29 will be moved up or down in the cylinders.

The extremities of each of the cylinders are connected by a pipe line 30 and branch pipes 31, which connect with the turbines 10. The branch pipes 31 connect with the pipes 30, as clearly shown in the enlarged Fig. 2. The passage of liquid, preferably oil, through these pipes is controlled by valves. These valves are adapted to operate in pairs so as to allow the liquid to circulate continuously in one direction or the other during the reciprocation of the pistons in the cylinders. This is accomplished by a pair of valves 32 and 33 operating in unison.

The valve 32 is within a cage 34 and is adapted to engage the valve seat 35. The valve 33 is in the cage 36 and is adapted to engage the valve seat 37. When these valves are free the liquid will pass through the lower pipe 31 for each forward stroke of the piston and return through the upper pipe 31. Thus, there is a continuous circuit in one direction. If it is desired to change the directional operation of the turbines, the valves 32 and 33 are rendered inoperative. This is accomplished by dampers 38 adapted to engage against the valves and hold them inoperative against the walls of the pipe.

The dampers 38 are mounted on bell cranks 39 moved by rods 40 which connect to the lower extremity 41' of a hand lever 41 which is pivotally mounted intermediately at 41$^a$. A point 41'' on the opposite side of the pivot 41$^a$ is connected by rods 42 with bell cranks 43 operating dampers controlling valves 45 and 46. The valve 45 is within a cage and capable of engaging against the seat 37. The valve 46 is also within a cage and capable of engaging against the seat 35. When the valves 32 and 33 are inoperative and the valves 45 and 46 operative, the fluid flows in the other direction because upon the down stroke of the piston the valve 45 is urged closed, and the valve 46 is opened. The rods 42 are passed through openings in the hand lever 41 and then bent over and fastened to the main section thereof by welding or similar means.

In Fig. 3 a portion of the turbine is illustrated. This turbine is shown to comprise a turbine casing 50 in which there is a rotor 51 having buckets 52. Nozzles 31' are directed against the buckets. The turbine is always filled with liquid, but when this liquid moves in one direction the rotor will turn one way, and when the liquid moves in the other direction the rotor will turn the other way. These buckets 52 consist of openings formed in the face of the rotor 51 against which the liquid acts to move the rotor which in turn rotates the axle 53 upon which it is fixedly attached. The rotor 51 is attached on a shaft 53 upon which the wheels of the vehicle are mounted.

The lever 41 is held stationary in desired positions by a rod 54 urged downwards by a spring 55, against an arcuate stationary bracket 56. The rod 54 may be released by a handle 54'.

The circuits for the liquid are controlled by foot-operated valves 57 and 58. The stems 59$^a$ of these valves are connected with a bridge piece 59 upon the top of which there is a foot pedal 60. When this foot pedal is depressed the valves are closed and the circuit for the liquid is shut off. Thus, the valves 57 and 58 act as a brake for the vehicle. A spring 61 acts between the line 31 and the bridge piece 59 to normally urge the valves 57 and 58 back to their normal positions.

The operation of the device is as follows: A person sitting on the seat 10 may rock back and forth to propel the vehicle. The rocking action of the chair 13 will be transmitted to operate the pistons 29, which in turn will cause the circulation of the liquid through the turbines. The setting of the valves determines in which direction the vehicle will travel. The direction may be reversed by a proper manipulation of the lever 41.

In Fig. 6 a single cylinder 61 is shown mounted on the vehicle 62. A piston 63 within this cylinder is operated by a pair of arcuate rods 64 which move about a pivot point 65. This pivot point is located on the standards 66. A rocking chair 67 is also pivoted on the pivot point 65. In other respects this form of the device is identical to the previous form. In illustrating the device, various parts have been omitted; that is, the turbines on the wheels, and the circuit for the liquid from the cylinder 61 to the turbines.

In Fig. 7 another embodiment of the invention is disclosed which is very similar to the form shown in Fig. 6, except for the fact that the chair 67' is supported upon an auxiliary shaft 65', and a toothed segment 69 is attached upon the chair 67' and moves about the pivot 65' and meshes with another toothed segment 70 which is pivoted on the pivot 65$^a$ on the standard 66$^a$. The toothed segment 70 supports several rods 64$^a$ which are connected with arcuate arms 64$^b$, in turn connected with the piston 63 within the cylinder 61. In other respects this form of the invention is identical to the previous forms.

In Figs. 8–10 inclusive a modified form of pump for circulating the liquid fluid is disclosed. This pump consists of a casing 70 having crossed cylinders, in each of which, there is a pair of double-acting pistons 71$^a$ and 71$^b$. The pistons in one of the cylinders are mounted upon a rod 72 which engages through an eye portion 73' of a rod 73 connecting the other pair of pistons. The arrangement is such that the pistons in each of the crossed cylinders may move independently of each other. The pistons are operated by mechanism connected with the extended ends of the rods 72 and 73.

Circulating pipes 74 are connected with the like phase ends of the crossed cylinders, and connect with a valve mechanism similar to that shown in Fig. 2. This mechanism is broadly indicated by reference numeral 75. The details of it will not be given in this specification since it would merely be a repetition of parts previously described.

In Fig. 11 another embodiment of the invention is disclosed in which a vehicle 76 is shown adapted to be driven by fluid turbines 77 connected with the wheels thereof and operated by a fluid circuit 78 connected with the ends of a cylinder 79. A piston 80 within the cylinder is operated by arcuate rods 81 pivoting about the fulcrum 82 of a board 83 which acts as a see-saw. Persons, indicated by the dot and dash lines, may sit upon the ends of the board. Handles 85 are provided on this device by which the operators may hold themselves in position on the fulcrum 82. The front handle 85 might be attached to a steering device which is not shown as it forms no part of this invention. Springs 86 and 87 normally tend to hold the board 83 in a horizontal neutral position. Auxiliary pistons 88 are arranged upon the vehicle immediately below the ends of the boards 83 and are operated by piston rods 89. These auxiliary pistons 88 act as dash pots to prevent a jerky movement when one's body is shifted on the fulcrum.

In Fig. 12 another modified form of the invention is disclosed in which a vehicle 90 is shown with liquid turbines 91 adapted to drive the wheels thereof. These turbines are connected with circuits 92 which connect with an arcuate cylinder 93. Within this cylinder there is a piston 94 operated by rods 95 connected with a chair 96 which is pivotally mounted at the point 97 upon a standard 98. In other respects this form of the invention is identical to the previous forms.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim as new, and desire to secure by United States Letters Patent is:

1. A drive means for vehicles and the like, comprising a movable member adapted to move to and fro when one's weight is continually resting thereon and shifted; a turbine for driving said vehicle, and said member operating said turbine.

2. A drive means for vehicles and the like, comprising a movable member adapted to move to and fro when one's weight is continually resting thereon and shifted; a turbine for driving said vehicle and said member operating said turbine, and a brake for arresting the flow of fluid through the turbine.

3. A drive means for vehicles and the like, comprising a movable member adapted to move to and fro when one's weight is continually resting thereon and shifted; a turbine for driving said vehicle and said member operating said turbine, and a means for changing the direction of the flow of fluid through the turbine.

4. A drive means for vehicles and the like, comprising a turbine for driving said vehicle and a manually operable rocker, see-saw, or similar device for operating said turbine, and a gear system interposed between said turbine and said manual means for changing the driving ratio.

5. Drive means, for vehicles and the like, comprising a liquid fluid turbine for driving said vehicle and the like, a circuit for said liquid, a pump for circulating said liquid in one direction or the other direction for driving the vehicle or the like in one direction or the other, and a manually operable rocker, see-saw, or similar mechanism for operating said pump, including a horizontal board pivoted at the center upon the ends of which persons may sit.

6. A drive means for vehicles and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight.

7. A drive means for vehicles and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight, said pump including, a cylinder mounted on the body of said vehicle, a manually operatable piston for forcing said liquid through said closed circuit to control the movement of said liquid.

8. A drive means for vehicles and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight, said closed circuit including, a pipe line including branch pipes and connecting the pump with the prime mover, a one-way valve at the junction of said pipe and said branch pipes for controlling the movement of said vehicle in one direction, a second one way valve at the junction of the said pipe and said branch pipes for controlling the movement of said vehicle in the other direction.

9. A drive means for vehicles and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight, said closed circuit including, a pipe line including branch pipes and connecting the pump with the prime mover, a one way valve at the junction of said pipe and said branch pipes for controlling the movement of said vehicle in one direction, a second one way valve at the junction of the said pipe and said branch pipes for controlling the movement of said vehicle in the other direction, each of said valves comprising, a valve seat at the opening of said branch pipes, a cage at either side of said valve seat, balls between said valve seat and said cage and adapted to engage or disengage said valve seats, a means for rendering said one way valve operative while said second one way valve is inoperative and vice versa to control the movement of said vehicle.

10. A drive means for vehicles and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight, said closed circuit including a pipe line including branch pipes and connecting the pump with the prime mover, a one way valve at the junction of said pipe and said branch pipes for controlling the movement of said vehicle in one direction, a second one way valve at the junction of the said pipe and said branch pipes for controlling the movement of said vehicle in the other direction, each of said valves comprising, a valve seat at the opening of said branch pipes, a cage at either side of said valve seat, balls between said valve seat and said cage and adapted to engage or disengage said valve seats, a means for rendering said one way valve operative while said second one way valve is inoperative and vice versa to control the movement of said vehicle, said means including, dampers adapted to engage said balls of the one way valve or the second one way valve, and a means for operating said dampers.

11. A drive means for vehicle and the like, comprising a prime mover connected to drive said vehicle and the like and having an inlet and outlet and adapted to be operated by a non-compressible liquid entering said inlet and discharging from the outlet, a closed circuit connecting the outlet and inlet for the passage of said liquid, a pump associated with said closed circuit for forcing said liquid therein continuously in one direction, and means for manually operating said pump by shifting one's weight, said closed circuit including a pipe line including branch pipes and connecting the pump with the prime mover, a one way valve at the junction of said pipe and said branch pipes for controlling the movement of said vehicle in one direction, a second one way valve at the junction of the said pipe and said branch pipes for controlling the movement of said vehicle in the other direction, each of said valves comprising, a valve seat at the opening of said branch pipes, a cage at either side of said valve seat, balls between said valve seat and said cage and adapted to engage or disengage said valve seats, a means for rendering said one way valve operative while said second one way valve is inoperative and vice versa to control the movement of said vehicle, said means including, dampers adapted to engage said balls of the one way valve or the second one way valve, and a means for operating said dampers, comprising, pivotally mounted bell cranks having one end connected to said dampers, a hand lever pivotally mounted intermediate of its ends upon the frame of said vehicle, rods connecting said bell cranks which operate said one way valve with the lower extremity of the hand lever to open said one way valve when the handle is moved forward and thus allow the vehicle to move in one direction, a second set of rods connecting said bell cranks which operate said second one way valve with the hand lever just above the pivoting point to open said second one way valve when the handle is moved backward and thus allow the vehicle to move in the other direction.

CHESTER C. KASKELL.